United States Patent [19]
Dewille et al.

[11] Patent Number: 5,554,589
[45] Date of Patent: Sep. 10, 1996

[54] METHOD OF ADDING FISH OIL TO AN ENTERAL NUTRITIONAL PRODUCT

[75] Inventors: Normanella T. Dewille, Upper Arlington; Terrence B. Mazer, Reynoldsburg, both of Ohio; Edward H. Parke, Portage, Mich.; Francis J. Cipriano, Three Rivers, Mich.; Dennis L. Raube, Sturgis, Mich.

[73] Assignee: Abbott Laboratories, Abbott Park, Ill.

[21] Appl. No.: 321,664

[22] Filed: Oct. 12, 1994

Related U.S. Application Data

[63] Continuation of Ser. No. 69,054, May 8, 1993, abandoned.

[51] Int. Cl.$^6$ .............................. A61K 47/44; A23J 1/04
[52] U.S. Cl. ................... 514/2; 426/72; 426/73; 426/319; 426/327; 426/656
[58] Field of Search .............................. 426/800, 72, 73, 426/319, 327, 656; 514/2

[56] References Cited

U.S. PATENT DOCUMENTS

| | | | |
|---|---|---|---|
| 3,719,502 | 3/1973 | Keely | 99/98 |
| 4,476,148 | 10/1984 | Harris | 426/629 |
| 4,961,939 | 10/1990 | Antrim et al. | 426/61 |
| 4,963,385 | 10/1990 | Antrim et al. | 426/602 |
| 5,223,285 | 6/1993 | DeMichele et al. | 426/72 |
| 5,232,725 | 8/1993 | Roderbourg et al. | 426/417 |
| 5,234,702 | 8/1993 | Katz et al. | 426/72 |

FOREIGN PATENT DOCUMENTS

| | | |
|---|---|---|
| 0298293 | 1/1989 | European Pat. Off. |
| 8141762 | 8/1983 | Japan. |
| 9041395 | 9/1993 | Japan. |

OTHER PUBLICATIONS

S. Cho et al. "Autoxidation of Ethyl Eicosapentaenoate and Docosohexaenoate". J. Amer. Oil Chemists Soc., vol. 64, pp. 876–879, 1987.

P. B. Adis, "Occurrence of Lipid Oxidation Products in Foods" Food Chemical Toxicology, vol. 24, No. 10/11, pp. 1201–1230, 1986.

M. W. Stansby, "Flavors and Odors of Fish Oils", J. American Oil Chemists Society, vol. 48, pp. 820–823, 1971.

K. Farstup et al "Organoleptic Evaluation of Fish Oil Off–Flavor" in Flavors and Off–Flavors, G. Charalambous, editor, Proc. 6th Int. Flavor Conference, Greece, Jul. 1989.

Przybylski et al JAOCS vol. 65, No. 4 (Apr. 1988) pp. 629–633.

Hsieh et al., "Factors Affecting Quality of Fish Oil . . . ", J. Food Sci, vol. 56(5), pp. 1298–1301, 1307, 1991.

Tsai C. E. et al., "Stability of Fish Oil . . . ", Nutr. Res., vol. 9(6), pp. 673–678, 1989.

*Primary Examiner*—Chhaya D. Sayala
*Attorney, Agent, or Firm*—L. R. Drayer; T. D. Brainard

[57] ABSTRACT

Fish oil is stored refrigerated under a nitrogen blanket until it is added to an enteral nutritional product during product manufacture. While the nutritional product is passing through a conduit the fish oil is added to the product at a uniform ratio such that the fish oil is evenly disbursed throughout the product, and thereafter the product is homogenized and heat treated.

3 Claims, No Drawings

METHOD OF ADDING FISH OIL TO AN ENTERAL NUTRITIONAL PRODUCT

This application is a continuation of U.S. patent application Ser. No. 08/069054 filed May 8, 1993, now abandoned.

The present invention relates to a method of adding fish oil to an enteral nutritional product during product production.

Fish oils containing n-3 fatty acids exhibit distinct fishy odors and flavors which can be objectionable to consumers. Long chain n-3 fatty acids, eicosapentaenoic acid (EPA, C20:5 n-3) and docosahexaenoic acid (DHA, C22:6 n-3), are susceptible to severe deteriorative loss in quality due to oxidation. P. B. Adis in "Occurrence of Lipid Oxidation Products in Foods", Food and Chemical Toxicology Vol. 24, No. 10/11, pp 1021–1030, (1986), indicates that lipid oxidation results in loss of flavor, development of off-flavor, loss of color, loss of nutrient value and accumulation of compounds which may be detrimental to health such as lipid peroxides, free-radicals, malonaldehyde and several cholesterol oxidation products. For example, coronary artery disease and carcinogenesis have been associated in part to some lipid oxidation compounds.

Conventional refining seems unsuitable for fish oils, and further deodorization processing is needed to obtain fish oils of optimal quality. A fish oil such as tuna oil or sardine oil may, for example, be incorporated into nutritional formulations for use in infant and/or adult populations. Such a fish oil is commercially available from Nippon Suisan/Mochida of Japan and is refined and deodorized to meet the strict specifications presented in Table 1. The commercially available fish oil contains 7000 ppm natural mixed tocopherols (mostly Delta tocopherol) and the oil is packed under nitrogen to avoid oxidation. The fish oil is transported via air freight to minimize transit time. Upon arrival at a nutritional product manufacturer, the oil is stored under refrigerated conditions (4° C.) for 56 to 70 days.

The handling of the fish oil during product manufacture is also critical since the flavor components in fish oil are highly labile and rapidly destroyed when the oil is exposed to even very low levels of oxygen for a relatively short time, even at low temperatures (M. W. Stansby, "Flavors and Odors of Fish Oils", Journal of the American Oil Chemists Society, 48(12), 820–823, 1971). Unless the fish oil is protected against oxidation, various carbonyl components will form to produce typical oxidative rancidity odors and flavors.

TABLE I

INGREDIENT SPECIFICATION FOR FISH OIL

| | SPECIFICATIONS |
|---|---|
| Color/Clarity | Pale yellow clear liquid oil |
| Flavor | Slight to moderate (or less) fishy, slight (or less/none) green/grassy, slight (or less/none) green onion-like, slight (or less/none) smokey, slight oily, no painty. |
| Aroma | Slight to moderate (or less) fishy, slight (or less/none) green/grassy, slight oily. |
| Aftertaste | Fishy, onion (if present in flavor), smokey (if present in flavor). |
| Fatty Acid Composition | Minimum 26% EPA; Minimum 11% DHA |
| Free Fatty Acids | 0.1% Maximum |
| Cholesterol | 0.1% Maximum |
| PCB | 0.1% Maximum |
| Arsenic | 2 ppm Maximum |
| Peroxide Value | 2.0 meq/Kg Maximum |
| Heavy Metals (as Pb) | 10 ppm Maximum |

K. Farstrup et al. in "Organoleptic Evaluation of Fish Oil Off-Flavor", G. Charalambous (Ed.), Flavors and Off-Flavors, Proceedings of the 6th International Flavor Conference, Greece, Jul. 5–7, 1989, indicate that the autoxidation of lipids is a free radical chain reaction, the rate of which is slow at the beginning but rapidly increases. The primary reaction between oxygen and unsaturated fatty acids results in the formation of hydroperoxides and cyclic peroxides which can react with other compounds or decompose to yield aldehydes, ketones, alcohols and different polymerization products (secondary reaction). Hydroperoxides are tasteless and odorless, while their decomposition products have great impact on flavor and odor. The most important aroma substances are volatile aldehydes and unsaturated ketones and furan derivatives.

Oxidation of Eicosapentaenoic Acid (EPA) and Docosapentaenoic Acid (DHA) proceeds much faster than in other less unsaturated long chain fatty acids such as linoleic and linolenic acids (S. Cho, et al. "Autoxidation of Ethyl Eicosapentaenoate and Docosahexaenoate", J. American Oil Chemists Society, 64(6), 876–879, 1987), thus the incorporation of fish oil to food formulations is quite challenging.

Typically, during manufacture of nutritional products, a lipid blend is prepared that contains the oils, oil soluble vitamins and emulsifiers. This blend is later combined with the carbohydrate/minerals and protein blends which are aqueous. Depending on the emulsifier used, the lipid blend needs to be heated to dissolve the emulsifier. For example, MYVEROL® has a melting point of 71° C., while PANODAN® has a melting point of about 57° C. Once the emulsifier is dissolved, the blend is kept at fairly high temperature and under agitation to prevent recrystallization. This blend can be held up to 12 hours before blending with the water phase and processing.

Based on the literature, the conditions described above are not adequate for highly unsaturated oils. A study was designed to evaluate the effect of atmosphere and holding time on sensory attributes of the oil blend. For that, eight batches were manufactured, kept either under nitrogen or regular atmosphere and evaluated at zero and ten hours. The holding temperature was 43° C.

Results are presented in Table 2. Although the results were not as conclusive as expected, the trends were in line with reports in the literature. For "fishy" notes, samples under nitrogen blankets were significantly better than those under air but there was no time effect. "Oxidized" and "painty" notes were not significantly different between samples stored under nitrogen and air. "Other" notes were significantly higher after ten hours of storage for both air and nitrogen. "Grassy" notes were significantly higher in the samples stored under nitrogen. "Grassy" notes are associated with fresh, nonoxidized oils, so they could be an indication that the oil under nitrogen is less oxidized. Aroma was significantly worse for samples stored under air.

TABLE 2

OIL BLEND ATMOSPHERE STUDY: N2 vs. O2
SUMMARY OF COMPARISONS

| PAA ATTRIBUTE | TIME EFFECT? | COMMON SLOPE? | | MEAN COMPARISON O2 | N2 | P-VALUE | SLOPE |
|---|---|---|---|---|---|---|---|
| Fishy | No | — | | 4.69* | 4.30* | .0506 | .031 |
| Oxidized | No | — | | 1.36 | 1.51 | .4805 | −.006 |
| Painty | No | — | | 1.21 | 1.14 | .3232 | .006 |
| Other | Yes | Yes | 10 hr | 2.58 | 2.46 | .7641 | .098* |
| Grassy | No | — | | 2.43* | 2.73* | .0147 | −.003 |
| Aroma | Yes | No | 2 hr | 3.47 | 3.60 | .7002 | N2: −.017 |
| | | | 10 hr | 3.66* | 3.47* | .0819 | O2: .023* |
| | | | 18 hr | 3.84* | 3.33* | .0146 | |
| Aftertaste | Yes | Yes | 10 hr | 4.41 | 4.34 | .7034 | .032* |
| Sour | No | — | | 3.20 | 3.14 | .7680 | .007 |

*Indicates a statistically significant difference at the .10 level of significance (p-value <.10). For the mean comparison, a statistically significant difference refers to the difference between the means; for the slope, a statistically significant difference indicates that the slope is greater than 0.

From this experimental work and the literature, it was concluded that a nitrogen atmosphere would be desirable and that increased holding times were detrimental to the sensory quality of the fish oil. Since nitrogen blanketing of an oil blend tank (having a capacity of about 2400 gallons) was expensive and presented safety concerns, an in-line metering device was designed that would maintain the fish oil under nitrogen at low temperature and that would feed it into the blend right before heat processing, thus avoiding lengthy holding time at high temperature, under agitation in the presence of air.

The system works as follows: The fish oil is fed from a nitrogen-flushed, refrigerated 80-gallon tank. Fish oil is metered from this tank into the product stream immediately prior to homogenization. A mass flow meter is used to meter the fish oil into the product while the product is passing through a conduit just prior to homogenizing and heat treating the product. Using this mass flow meter, the oil mass flow rate, as well as the fish oil cumulative weight, is monitored such that the fish oil is always in the proper weight ratio to the total product weight. The product flow is always monitored and if there is a disruption in product flow, fish oil flow will start and stop simultaneously with product flow. Put another way, the fish oil is added to a product slurry passing through a conduit at a uniform rate such that the fish oil is evenly disbursed throughout the slurry.

This system was tried during the manufacture of a liquid nutritional product. The flow was maintained and the oil was held under optimal conditions during the entire operation.

There is provided in accordance with the present invention a method of adding fish oils or other labile oils to an enteral nutritional product during product manufacture by which the oil is maintained at refrigerated temperature and under nitrogen in a reservoir, as long as possible during product manufacture. The oil is incorporated directly from the reservoir into the product stream immediately prior to homogenization. In this way, nitrogen blanketing of a large oil blend tank is not needed since the other oils are not as sensitive to high heat and air as the more unsaturated fish oils.

We claim:

1. A method of making an enteral nutritional product containing fish oil comprising the sequential steps of:
   (a) preparing a slurry which is free of fish oil and containing protein and carbohydrates;
   (b) passing the slurry through a conduit immediately prior to the slurry entering a homogenizer and using a mass flow meter to meter fish oil into the slurry in the conduit at a uniform rate such that the fish oil is evenly disbursed throughout the slurry, said fish oil up to the time of addition to the slurry being maintained at a temperature of not greater than about 4° C. under a nitrogen blanket; and
   (c) immediately thereafter homogenizing and heat treating the product of step (b).

2. A method of making an enteral nutritional product containing fish oil according to claim 1 wherein the slurry prepared in step (a) is an aqueous slurry.

3. A method of making an enteral nutritional product containing fish oil according to claim 1 wherein the slurry prepared in step (a) is a blend of an aqueous slurry containing protein and carbohydrates and an oil blend containing oil soluble vitamins and emulsifiers.

* * * * *